United States Patent Office 3,376,288
Patented Apr. 2, 1968

3,376,288
PHENYL PYRAZOLE CARBONYL SUBSTITUTE 6-AMINO PENICILLANIC ACIDS
Odon Feher, Istvan Koczka, and Laszlo Vargha, Budapest, Hungary, assignors to Chinoin Gyogyszer-es Vegyeszeti Termekek Gyara RT., Budapest, Hungary, a firm
No Drawing. Filed May 31, 1966, Ser. No. 553,691
Claims priority, application Hungary, Sept. 24, 1965, GO-964
2 Claims. (Cl. 260—239.1)

This invention relates to new derivatives of 6-aminopenicillanic acid of pharmaceutical value. More particularly it is concerned with 6-amino-penicillanic-acids substituted on the amino group by pyrazole carbonyl radicals.

It is known that 6-amino-penicillanic acid derivatives having similar effect to penicillins obtained by means of biosynthetic methods may be prepared by acylating 6-aminopenicillanic acid by known methods. The difference in the structure of these compounds resides in the acyl-groups and accordingly they show different antibacterial activity.

Although penicillins obtained by biosynthetic procedures are very effective in the treatment of diseases caused by Gram-positive bacteria, said compounds have the considerable disadvantage of being practically ineffective against several so-called resistant strains, such as resistant strains of *Staphylococcus aureus*. 1-phenyl-3,5-disubstituted - 4 - pyrazolyl-penicillins are effective against resistant strains of *Staphylococcus aureus* too, but they exert their effect mainly if administered parenterally. Said compounds are but slightly suitable for oral administration due to their relatively slower adsorption from the digestive system.

According to the present invention there are provided new derivatives of 6-amino penicillanic acid of the general Formula I

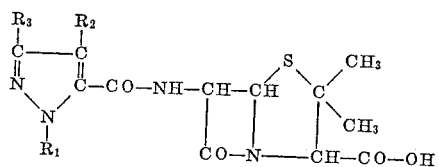

and salts thereof, wherein $R_1$ is a member selected from the group consisting of phenyl, halogeno-substituted-phenyl, amino-substituted-phenyl, alkyl-substituted-phenyl and cycloalkyl, $R_2$ is a member of the group consisting of halogen and alkyl having 1 to 5 carbon atoms, $R_3$ is a member of the group consisting of hydrogen and alkyl having 1 to 5 carbon atoms.

The compounds according to the present invention are highly effective against microorganism sensible to benzyl-penicilline and also against those resistant to benzyl-penicillin and producing penicillinase. The compounds of the general Formula I possess significant advantages in comparison with the 4-pyrazolyl-penicillins as they exert considerably higher activity against resistant strains of *Staphylococcus aureus* and are adsorbed from the digestive system more quickly and completely. The new compounds of the present invention are considerably resistant to mineral acids. A further advantage of the compounds of the general Formula I is that they are suitable for both parenteral and oral administration.

As suitable members for $R_1$ when it stands for a substituted phenyl radical there may be mentioned phenyl radicals substituted by halogens (preferably chlorine or bromine) or alkyl groups (straight or branched chained alkyl groups containing preferably not more than 5 carbon atoms, such as methyl, ethyl, n-propyl, isopropyl, n-butyl, etc.) or amino group. The phenyl radical may be substituted by one or more of the above substituents.

As a suitable member of $R_1$ when it stands for a cycloalkyl radical there may be mentioned cycloalkyl radicals having 5 to 8 carbon atoms, such as cyclobutyl, cyclopentyl, cyclohexyl, cycloheptyl, cyclooctyl.

As a suitable member of $R_2$ and $R_3$ when they represent—an alkyl group consisting of 1 to 5 carbon atoms, there may be mentioned straight or branched chain alkyl groups, such as methyl, ethyl, n-propyl, isopropyl, n-butyl, isobutyl.

$R_2$ in its meaning for halogen may stand for chlorine, bromine, iodine or fluorine.

Particularly advantageous representatives of the compounds of the general Formula I according to the present invention are the following derivatives:

A compound selected from the group consisting of
1-phenyl-3-methyl-4-bromo-5-pyrazolyl-penicillin,
1-(p-bromophenyl)-3-methyl-4-bromo-5-pyrazolyl-penicillin,
1-(p-chlorophenyl)-3-methyl-4-bromo-5-pyrazolyl-penicillin,
1-(p-chlorophenyl)-3-methyl-4-chloro-5-pyrazolyl-penicillin 1-cyclohexyl-3-methyl-4-chloro-5-pyrazolyl-penicillin,
1-phenyl-4-methyl-5-pyrazolyl-pencillin,
1-(p-chlorophenyl)-4-methyl-5-pyrazolyl-pencillin,
1-(2,6-dichloro-phenyl)-4-methyl-5-pyrazolylpenicillin,
1-(2,4,6-trichlorophenyl)-4-methyl-5-pyrazolyl-penicillin,
1-cyclohexyl-4-methyl-5-pyrazolyl-penicillin and
salts of the above compounds.

The new compounds of the general Formula I can be prepared by reacting 6-amino-penicillanic acid or a salt, thereof with acids of the general Formula II

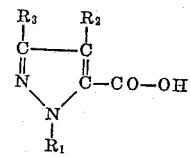

(wherein $R_1$, $R_2$ and $R_3$ has the same meaning as stated above) or derivatives thereof capable for the acylation of amines.

The 6-amino-penicillanic acid is preferably used in the form of a salt formed with metals, or with organic bases such as triethylamine. As reactive derivatives of the acids of general Formula II capable of acylating the 6-amino-penicillanic acid, the halogenides (preferably the chlorides or the bromides) or the anhydrides or the mixed anhydrides of the acids of the general Formula II can be used in the presence of an acid-binding agent. One may also proceed by using the free acids in the presence of a water-binding agent or the azides or activated esters of the acids (e.g. the p-nitro-phenyl-esters). As anhydrides of the acids of the general Formula II, the mixed anhydrides formed with carboxylic acid monoesters (e.g. with carboxylic acid isobutyl ester) may be particularly advantageously applied. Inorganic bases (such as alkali hydroxides, e.g. sodium hydroxide and potassium hydroxide; alkali carbonates, e.g. sodium carbonate, potassium carbonate; phosphate buffers, etc.) and organic bases (e.g. triethylamine, pyridine) may be used as acid-binding agent. It is preferred to use dicyclohexyl-carbodiimide as water-binding agent.

The acylation reaction may be carried out in an anhydrous organic solvent (such as chloroform or dichloromethane) as medium. According to another form of realization of the process an aqueous organic solvent miscible with water (such as acetone or dioxane) is used. One may also proceed by using a mixture of water and an organic solvent immiscible with water (e.g. methyl-iso-butyl-ketone or butyl acetate).

According to a preferable form of realization of the process according to the present invention, the triethylamine salt of 6-amino-penicillanic acid is reacted with the acid chlorides of the acids of the general Formula II in anhydrous chloroform as medium, while triethylamine or advantageously the triethylamine salt of 6-amino-penicillanic acid acts as acid-binding agent. The excess of 6-amino-penicillanic acid which did not participate in the reaction may be recovered with high yields. One may also proceed by reacting the aqueous solution of an alkali salt of 6-amino-penicillanic acid with the solution of the acid chloride of the acids of the general Formula II in an organic solvent such as methyl-isobutyl-ketone or acetone.

The new penicillanic acid derivatives of the general Formula I may be isolated from the reaction mixture by known methods. The products may be separated in the form of the free acid or as a salt of same. One may also proceed by converting the free acids of the general Formula I into their salts formed with bases. Inorganic bases (such as sodium hydroxide, potassium hydroxide, potassium carbonate, sodium carbonate, ammonium hydroxide, calcium hydroxide, etc.) or organic bases (such as triethylamine, piperidine, N-ethyl-piperidine, cyclohexylamine, benzylamine, dibenzyl-ethylene-diamine).

The new compounds of the general Formula I or the salts thereof may be transformed into pharmaceutical compositions comprising at least one of said compounds as active ingredient admixed with suitable pharmaceutical carriers or excipients.

Said pharmaceutical compositions may be in form suitable for oral, rectal or parenteral use. The compositions may contain sweetening, flavouring, colouring and preserving agents. Compositions intended for oral use may be prepared according to any method known in the art for the manufacture of pharmaceutical compositions, such as tablets, coated pills, suspensions, solutions, powders, granules, capsules or emulsions. The tablets may contain non-toxic excipients commonly used in the manufacture of tablets, thus they may contain lubricating, binding, granulating and disintegrating agents, diluents and so on.

Suspensions or solutions may contain e.g. the following excipients: suspending agents, dispersing or wetting agents, preservatives or thickening agents. Powders and granules may contain wetting and suspending agents too.

The pharmaceutical compositions may be in the form of suppositories. These compositions are prepared by mixing the active compounds with a suitable non-irritating excipient, such as cocoa-butter or polyethylene-glycols.

The pharmaceutical compositions may contain additional compounds having themselves pharmaceutical activity, such as antibiotics (e.g., oxytetracycline, tetracycline, streptomycine, fumagilline and nystatine), chemotherapeutic agents (e.g. sulfadimidine and sulfamethoxypyridazine) or antihistamines (e.g. phenidamine) etc.

All the new compounds of the general Formula I proved to be effective against resistant strains. Thus, the potassium salt of 1-(2,5-dichlorophenyl)-4-methyl-5-pyrazolyl penicillin inhibits the multiplication of the *Staphylococcus aureus* No. 80/81 strain being resistant to benzyl-penicillin in a concentration of 0.1 μg./ml., on the other hand the known sodium salt of 1,5-diphenyl-3-methyl-4-pyrazolyl penicillin was effective against said strain only in a concentration of 0.6 μg./ml.

1-(2,6-dichlorophenyl)-4-methyl-5-pyrazolyl (penicillin prepared according to the present invention possesses more advantageous properties than the known 5-methyl-3-phenyl-4-isoxazolyl)-penicillin oxacillin. On liquid nutrient media the product inhibits the multiplication of Staphylococcus strain resistant to penicilline derived from clinical material in smaller concentration than the known oxacillin. More than 100 strains have been tested and they proved to be resistant against penicillin under similar conditions. Beside the penicillinase stability it is very remarkable that the product is also much more stable in a strongly acidic solution, than the known compound oxacillin. This is probably one of the reasons of the fact that in animal tests the product has been found to be significantly more effective than oxacillin especially in the case of oral administration. The product is highly effective against Streptococcus strains too, both in test-tube tests and in those carried out on mice. The advantage of oral administration was apparent by the above test as well.

The toxicity of the product is extremely low, it exhibits its effect first of all under neutral conditions. The product is effective in the first place against Gram-positive microorganisms and it effects Staphylococcus strains producing penicillinase and those not producing the same approximately equally.

The acids of the general Formula II and the derivatives of same capable for acylation used as starting material are new compounds and their preparation is described in the examples.

Further details of our process are to be found in the following examples. It is by no means intended to limit our invention to said specific examples.

Example 1

7.65 g. of 6-amino-penicillanic acid are suspended in 250 ml. of anhydrous chloroform, whereupon 3.58 g. of triethylamine are added dropwise, under constant stirring at a temperature of 0–3° C. A solution of 5.30 g. of 1-phenyl - 3 - methyl - 4 - bromo - 5 - pyrazole - carboxylic acid chloride in 60 ml. of anhydrous chloroform is added within 2 hours. The reaction mixture is stirred for 3 hours at a temperature in the range of 0 and 3° C. whereupon the insoluble excess of 6-amino-penicillanic acid is filtered off. The mixture is extracted with diluted phosphoric acid and then several times with ice-cold water at 0–3° C. The chloroform solution is dried over anhydrous magnesium sulphate and filtered, whereupon a solution of 2.64 g. of the potassium salt of heptane-3-carboxylic acid and 12 ml. of n-butanol is added. Chloroform is distilled off at room-temperature in vacuo, the residual syrup is triturated with ether and the precipitated product is filtered. Thus 7.00 g. of the potassium salt of 1-11-phenyl-3-methyl-4-bromo-5-pyrazolyl-penicillin are obtained in the form of a yellowish powder. The purity of the product was found to be 85% according to iodometric determination.[1]

The acid chloride used as starting material (M.P. 71–72° C.) may be prepared by boiling a mixture of 4.00 g. of 1 - phenyl - 3 - methyl - 4 - bromo - pyrazole - 5 - carboxylic acid,[2] 20 ml. of benzene and 6 ml. of thionyl chloride for an hour evaporating the reaction mixture to dryness under reduced pressure and recrystallizing the residue from petrol (B.P. 60–80° C.).

Example 2

A solution of 0.93 g. of 6-amino-penicillanic acid and 0.44 g. of triethylamine in 30 ml. of anhydrous chloroform is reacted with a solution of 0.82 g. of 1-(p-bromophenyl) - 3 - methyl - 4 - bromo - 5 - pyrazole - carboxylic acid chloride in 10 ml. of anhydrous chloroform, according to the process described in Example 1. Thus, 0.49 g. of the potassium salt of 1-(p-bromophenyl)-3-methyl-4-bromo-5-pyrazolyl penicillin are obtained in the form of ---
[1] J. F. Alicino: Ind. Eng. Chem. Anal. Ed., 18, 619 (1946).
[2] I. L. Finar, D. B. Müller: J. Chem. Soc. 1961, 2769.

a yellowish powder. The purity of the product was found to be 30% according to iodometric determination.

The acid chloride used by acylation (M.P. 133–134° C.) may be obtained by boiling a mixture of 1.27 g. of 1 - (p-bromophenyl) - 3 - methyl-4-bromo-pyrazole-5-carboxylic acid,[2] 20 ml. of anhydrous benzene and 5 ml. of thionyl chloride for 10 hours, evaporating the reaction mixture to dryness in vacuo and recrystallizing the residue thus obtained from petrol (B.P. 60–80° C.).

Example 3

A solution of 1.05 g. of 6-amino-penicillanic acid and 0.49 g. of triethylamine in 35 ml. of anhydrous chloroform is reacted with the solution of 0.81 g. of 1-(p-chlorophenyl) - 3 - methyl - 4 - bromo - 5 - pyrazole - carboxylic acid chloride and 10 ml of anhydrous chloroform according to the process described in Example 1. Thus, 1.07 g. of the potassium salt of 1-(p-chlorophenyl)-3-methyl-4-bromo-5-pyrazolyl penicillin are obtained in the form of a yellowish powder. The purity of the product amounts to 78% according to iodometric analysis.

The acid chloride used by acylation (M.P. 128–130° C.) may be prepared as follows. The mixture of 10 g. of 1-carbethoxy-1-oxo-3-ethoxy-2-butene[3], 9.6 g. of p-chlorophenylhydrazine hydrochloride 4.45 g. of anhydrous sodium acetate and 70 ml. of anyhdrous acetic acid are heated at 95–100° C. for an hour, whereupon the reaction mixture is diluted with 700 g. of icewater, the precipitated product is filtered and crystallized from 50% aqueous ethanol. The 1-(p-chlorophenyl)-3-methyl-5-carbethoxy-pyrazole thus obtained (M.P. 128–130° C.) is boiled with 50 ml. of a 10% ethanolic potassium hydroxide solution for an hour, whereupon the ethanol is evaporated in vacuo, the residue is dissolved in water and the pH of the solution is adjusted to the value of 2 with hydrochloric acid. The precipitated 1-(p-chlorophenyl)-3-methyl-pyrazole-5-carboxylic acid is filtered off, dried and crystallized from ethanol. M.P. 212–214° C. (decomposition).

To a mixture of 2.81 g. of 1-(p-chlorophenyl)-3-methylpyrazole-5-carboxylic acid and 65 ml. of acetic acid 1.9 g. of bromine are added. The reaction mixture is stirred for an hour at 20–25° C., then at 95–100° C. for 5 minutes, whereupon 70 ml. of hot water are added. The precipitated 1-(p-chlorophenyl)-3-methyl-4-bromo-pyrazole-5-carboxylic acid is crystallized from ethanol (M.P. 224–226° C., decomposition). The free acid is converted into the acid chloride by boiling same in a mixture of 12 ml. of anhydrous benzene and 3.6 ml. of thionyl chloride for 3 hours. The acid chloride may be isolated according to the method described in Example 1.

Example 4

10.40 g. of 6-amino-penicillanic acid and 4.87 g. of triethylamine are dissolved in 120 ml. of anhydrous chloroform, whereupon the solution of 7.00 g. of 1-(p-chlorophenyl) - 3 - methyl - 4 - chloro - 5 - pyrazole - carboxylic acid chloride in 70 ml. of anhydrous chloroform is added and the reaction is carried out according to the process set forth in Example 1. Thus, 11.10 g. of the potassium salt of 1-(p-chlorophenyl)-3-methyl-4-chloro-5-pyrazolyl-penicillin are obtained in the form of a white powder. The purity of the product was found to be 95% according to iodometric analysis.

The acid chloride (M.P. 114–115° C.) used by acylation is obtained by boiling 8.5 g. of 1-(p-chlorophenyl)-3-methyl-5-carbethoxypyrazole with a mixture of 85 ml. of anhydrous benzene and 5.3 ml. of sulfuryl chloride for an hour and evaporating the reaction mixture to dryness under reduced pressure. The 1-(p-chlorophenyl)-3-methyl-4-chloro-5-carbethoxy-pyrazole (M.P. 126–127° C.) thus obtained is converted into the corresponding free acid by means of hydrolysis carried out in alkaline medium. The free acid (M.P. 221–223° C., decomposition) is heated with 45 ml. thionyl chloride in 180 ml. of anhydrous benzene for 4 hours. The 1-(p-chlorophenyl)-3-methyl-4-chloro-5-pyrazole-carboxylic acid chloride thus obtained is recovered according to the process described in Example 1.

Example 5

1.17 g. of 6-amino-penicillanic acid and 0.55 g. of triethylamine are dissolved in 18 ml. of anhydrous chloroform, whereupon the solution of 0.71 g. of 1-cyclohexyl-3-methyl-4-chloro-5-pyrazole-carboxylic acid chloride and 8 ml. of anhydrous chloroform is added and the reaction is carried out as described in Example 1. Thus 0.51 g. of the potassium salt of 1-cyclohexyl-4-methyl-4-chloro-5-pyrazolyl-penicillin are obtained in the form of a white powder. The purity of the product amounts to 95% according to iodometric titration.

The acid chloride used by acylation (M.P. 62–64° C.) is prepared by boiling 5.58 g. of 1-carbethoxy-1-oxo-3-ethoxy-2-butene[3] and 5.65 g. of cyclohexyl-hydrazine hydrochloride in 25 ml. of anhydrous ethanol for an hour, evaporating the ethanol under reduced pressure, dissolving the residue in ether and washing same until neutral with a sodium hydrogencarbonate solution and with water. The etherous solution is dried and evaporated in vacuo, whereupon the residue is distilled off under reduced pressure. The boiling point of 1 - cyclohexyl - 3 - methyl - 5 - carbethoxy-pyrazole amounts to 111–113° C. at 0.1 Hg mm. 2.45 g. of the product thus obtained are boiled with 1.7 ml. of sulfuril chloride in 20 ml. of anhydrous benzene, whereupon the reaction mixture is evaporated in vacuo and the residue is converted into 1-cyclohexyl - 3 - methyl - 4 - chloro-pyrazole - 5 - carboxylic acid by means of boiling with an ethanolic potassium hydroxide solution. The free acid may be purified by recrystallizing from a 50% aqueous ethanol solution. M.P. 185–187° C., decomposition. The acid chloride may be prepared by boiling 1 g. of the free acid with 20 ml. of anhydrous benzene and 2 ml. of thionyl chloride for 2 hours, evaporating the mixture to dryness and crystallizing the residue from petroleum ether (B.P. 40–60° C.)

Example 6

2.33 g. of 6-amino-penicillanic acid and 1.09 g. of triethylamine are dissolved in 24 ml. of anhydrous chloroform, whereupon the solution of 1.19 g. of 1-phenyl-4-methyl - 5 - pyrazole-carboxylic acid chloride in 12 ml. of anhydrous chloroform is added and the reaction is carried out according to the method described in Example 1. Thus, 2.00 g. of the potassium salt of 1-phenyl-4-methyl-5-pyrazolyl-penicillin are obtained in the form of a white powder. The purity of the product was found to be 92% according to iodometric analysis.

The acid chloride used by acylation (M.P. 67–68° C.) may be obtained as follows: A mixture of 39 g. of ethyl (2-oxo-butyrate [4]), 54 g. of ethyl-orthoformate 0.07 g. of anhydrous zinc chloride and 77 ml. of anhydrous toluene is boiled for 5–6 hours so that the ethanol formed by the reaction is continuously distilled off and the simultaneously evaporating toluene is supplied. The product is isolated by means of fractional distillation. The fraction obtained at 80–100° C. 0.2 Hg mm. is dissolved in 40 ml. of anhydrous toluene, whereupon 0.46 g. of p-toluene-sulfonic acid are added and the reaction mixture is boiled for 45–60 minutes, where the ethanol formed in the course of the reaction is distilled off. The mixture is subjected to fractional distillation, whereupon ethyl 2-oxo-3-ethoxymethylene-butyrate is obtained in the form of an oil; B.P. 93–99° C. 0.2 Hg mm.

37.7 g. of ethyl-2-oxo-3-ethoxymethylene-butyrate and 370 ml. of anhydrous ethanol are added to 32.3 g. of phenyl-hydrazine-hydrochloride and the mixture is boiled for an hour. Ethanol is evaporated in vacuo, and the residue is dissolved in ether. The etherous solution is washed until neutral with a sodium hydrogen carbonate solution and with water and is evaporated. The residue is purified

[2] I. L. Finar, D. B. Müller; J. Chem. Soc. 1961, 2769.
[3] L. Claisen: Ber. 40; 3903 (1907). A. Rossi, H. Schinz: Helv. Chim. Acta 31, 1740 (1948).
[4] E. Vogel, H. Schinz: Helv. Chim. Acta 33, 116 (1950).

by means of fractional distillation. The crude 1-phenyl-4 - methyl - 5 - carbethoxy-pyrazole (B.P. 135–140° C. 0.2 Hg mm.) thus obtained is converted into 1-phenyl-4-methyl-pyrazole-5-carboxylic acid by boiling with an ethanolic potassium hydroxide solution. The free acid is purified with the aid of recrystallization from ethanol (M.P. 206–208° C.), decomposition. The free acid is converted into the corresponding acid chloride by means of treating same with thionyl chloride in benzene as medium, according to the method described in Example 1.

Example 7

1.41 g. of 6-amino-penicillanic acid and 0.66 g. of triethylamine are dissolved in 16 ml. of anhydrous chloroform, whereupon the solution of 0.83 g. of 1-(p-chlorophenyl) - 4 - methyl - 5 - pyrazole-carboxylic acid chloride in 9 ml. of anhydrous chloroform is added and the reaction is carried out according to the process set forth in Example 1. Thus, 1.10 g. of the potassium salt of 1-(p-chlorophenyl) - 4 - methyl - 5 - pyrazolyl-penicillin are obtained in the form of a white powder. The purity of the product was found to be 91% according to iodometric analysis. The acid chloride used by acylation (M.P. 112–113° C.) is prepared as follows: 5.2 g. of ethyl-2-oxo-3-ethoxymethylene butyrate and 5 gr. of chlorophenyl-hydrazine-hydrochloride are boiled in 39 ml. of anhydrous ethanol for an hour, whereupon 17 ml. of a 17% aqueous sodium hydroxide solution are added and the reaction mixture is boiled further on for an hour. Ethanol is distilled off, the residue is dissolved in water, the solution is extracted with ether 3 times. The ether is evaporated from the aqueous solution in vacuo and the pH of the solution is adjusted to the value of 2 with hydrochloric acid. The precipitated product is filtered, dried and boiled with a mixture of 20 ml. of ethanol and of 0.6 ml. of concentrated sulfuric acid for 2 hours. Ethanol is distilled off in vacuo, the residue is suspended in a 10% aqueous sodium carbonate solution and the insoluble solid material, if present, is extracted with ether. The ether is distilled off from the aqueous solution under reduced pressure. The pH of the solution is adjusted to the value of 2 with hydrochloric acid. The precipitated 1-(p-chlorophenyl)-4-methyl-pyrazole-5-carboxylic acid is filtered, dried and crystallized from ethanol. M.P. 204–207° C. (decomposition). The acid chloride may be prepared by treating the free acid with thionyl chloride in benzene as medium, according to the method described in Example 1.

Example 8

(a) 6.84 g. of 6-amino-penicillanic acid and 3.20 g. of triethylamine are dissolved in 100 ml. of anhydrous chloroform, whereupon the solution of 4.58 g. of 1-(2,6-dichlorophenyl) - 4 - methyl - 5 - pyrazole-carboxylic acid chloride in 40 ml. of anhydrous chloroform is added and the reaction is carried out according to the process described in Example 1. Thus, 7.12 g. of the potassium salt of 1 - (2,6 - dichloro-phenyl) - 4 - methyl - 5 - pyrazolyl-penicillin obtained in the form of a white powder. The product contains 1 molecule of crystal water. ($d_D^{20}$ +109.9°/c.:1, in acetone).

Analysis: C, 43.0%; H, 3.9%; Cl, 13.1%; N, 10.5%; S, 6.0%. Calculated for $C_{19}H_{17}Cl_2KNO_4O_4S \cdot H_2O$: C, 43.4%; H, 3.6%; Cl, 13.5%; N, 10.7%; S, 6.1%.

This compound inhibits the multiplication of strain *Staphylococcus aureus* 80/81, resistant against benzylpenicillin, in the concentration of 0.1 μg. ml. The product is highly acid-resistant; when kept in a 0.1 N aqueous hydrochloric acid solution at 20° C. for 3 hours, the activity of same decreases only by 40%.

The acid chloride used by acylation (M.P. 86–88° C.) may be prepared as follows: 8.71 g. of ethyl-2-oxo-3-ethoxymethylene-butyrate and 10 g. of 2,6-dichlorophenyl-hydrazine hydrochloride are boiled in 60 ml. of anhydrous ethanol for an hour, whereupon 28 ml. of a 17% aqueous sodium hydroxide solution are added and the reaction mixture is boiled further on for an hour. Ethanol is distilled off in vacuo, the residue is suspended in 50 ml. of water and the aqueous solution is extracted twice with 15—15 ml. portions of benzene. The benzene is distilled off from the aqueous solution, in vacuo, and the pH of the aqueous solution is adjusted to the value of 2 with hydrochloric acid. The precipitated crude product is filtered off, dried, whereupon it is boiled with a mixture of 45 ml. of anhydrous ethanol and 1.35 ml. of concentrated sulfuric acid for 2 hours. The ethanol is evaporated under reduced pressure, the residue is suspended in 60 ml. of a 10% aqueous sodium carbonate solution and the insoluble solid material, if present, is extracted with benzene. The solvent is evaporated in vacuo and the pH of the aqueous solution is adjusted to the value of 2 with hydrochloric acid. The precipitated 1-(2,6-dichlorophenyl)-4-methyl-pyrazole-5-carboxylic acid may be purified by means of recrystallization from 40% aqueous ethanol (M.P. 225–231° C., decomposition). The acid chloride is obtained by boiling 50 g. of the free acid with the mixture of 250 ml. of anhydrous benzene and 100 ml. of thionyl chloride for 2 hours, evaporating the solvent in vacuo and crystallizing the residue from petrol (B.P. 60–80° C.).

(b) 1.47 g. of 6-amino-penicillanic acid and 1.38 g. of triethylamine are dissolved in 27 ml. of anhydrous chloroform, whereupon a solution of 1.97 g. of 1-(2,6-dichlorophenyl)-4-methyl-5-pyrazole-carboxylic acid chloride in 18 ml. of anhydrous chloroform is added and the reaction is carried out according to the process described in Example 1. Thus, 2.39 g. of the potassium salt of 1-(2,6-dichlorophenyl)-4-methyl-5-pyrazolyl-penicillin are obtained in the form of a faint yellow powder. The purity of the product was found to be 79% according to iodometric titration.

(c) 2.16 g. of 6-amino-penicillanic acid are suspended in 20 ml. of water, whereupon the pH is adjusted to the value of 7.2 by adding a 1 N aqueous sodium hydroxide solution at 0–5° C. under stirring. A solution of 2.90 g. of 1-(2,6-dichlorophenyl)-4-methyl - 5 - pyrazole-carboxylic acid chloride in 30 ml. of methyl-isobutyl-ketone is added under stirring. The reaction mixture is stirred at room temperature for 2 hours, whereupon the aqueous layer is separated and the methyl-isobutyl-ketone phase is extracted with diluted phosphoric acid and several times with ice-cold water at a temperature in the range of 0–5° C. The organic layer is dried over anhydrous magnesium sulfate, filtered whereupon the solution of 1.24 g. of the sodium salt of heptane-3-carboxylic acid and 5 ml. of n-butanol is added. The reaction mixture is admixed with anhydrous ether and the precipitated product is filtered off. Thus, 3.10 g. of the sodium salt of 1-(2,6-dichlorophenyl)-4-methyl-5-pyrazolyl - penicillin are obtained. The purity of the product was found to be 94% according to iodometric analysis.

(d) 1.62 g. of 6-amino-penicillanic acid are suspended in 8 ml. of water, whereupon the pH is adjusted to the value of 7.2–7.6 by adding an aqueous 1 N sodium hydroxide solution at a temperature in the range of 0–5° C. under constant stirring. The solution thus obtained is added at once under stirring to the cooled (0° C.) solution of 1.97 g. of 1-(2,6-dichlorophenyl)-4-methyl-5-pyrazole-carboxylic acid chloride and 15 ml. of acetone. The temperature of the solution rises to 16–20° C. The mixture is stirred under cooling at 0–3° C. for 2 hours, whereupon 20 ml. of ether are added and stirring is continued for 5 minutes. The aqueous phase is separated and extracted with 2×10 ml. portions of ether, whereupon the united ether solution is washed with diluted sulfuric acid at 0° C. and then several times with ice-cold water. The solution is dried over anhydrous magnesium sulfate, filtered and evaporated at a temperature in the range of 0–10° C. in vacuo. Thus, 3.06 g. of 1-(2,6-dichlorophenyl)-4-methyl-5-pyrazolyl penicillin are obtained in the form of a white powder. The purity of the product was found to be 89% according to iodometric analysis.

0.90 g. of the product thus obtained are dissolved in anhydrous ether, whereupon 0.2 g. of cyclohexylamine are added and the precipitated product is filtered off. Thus, 0.85 g. of the cyclohexylamine salt are obtained. The purity of the product was found to be 93% according to iodometric analysis.

Example 9

1.47 g. of 6-amino-penicillanic acid and 0.68 g. of triethylamine are dissolved in 21 ml. of anhydrous chloroform, whereupon the solution of 1.10-g. of 1-(2,4-trichlorophenyl)-4-methyl-5-pyrazole-carboxylic acid chloride in 13 ml. of anhydrous chloroform is added and the reaction is carried out according to the process set forth in Example 1. Thus, 1.36 g. of the potassium salt of 1-(2,4,6-trichlorophenyl)-4-methyl-5-pyrazolyl - penicillin are obtained in the form of a white powder. The purity of the product was found to be 87% according to iodometric analysis.

The acid chloride used by acylation (M.P. 101–102° C.) may be prepared by boiling 9.3 g. of ethyl-2-oxo-3-ethoxymethylene-butyrate and 13.2 g. of 2,4,6-trichlorophenyl-hydrazine hydrochloride in 50 ml. of anhydrous ethanol for 1 hour, whereupon the ethanol is distilled off in vacuo and the residue is admixed with water. The precipitated product is filtered off, dried, whereupon it is boiled with 150 ml. of ethanol containing 10% of potassium hydroxide for an hour. Ethanol is evaporated, the residue is dissolved in water and extracted with ether. The ether content of the aqueous phase is distilled off in vacuo, whereupon the pH of the aqueous solution is adjusted to the value of 2 with hydrochloric acid. The precipitated product is filtered off, dried, whereupon it is boiled with 126 ml. of ethanol containing 2% of hydrochloric acid for 30 minutes. The ethanol is evaporated in vacuo and the residue is suspended in a 10% aqueous sodium carbonate solution. The insoluble particles, if present, are extracted with ether. The aqueous solution is made free of ether in vacuo, whereupon its pH is adjusted to the value of 2 with hydrochloric acid and the precipitated 1-(2,4,6-trichlorophenyl)-4-methyl-pyrazole-5-carboxylic acid is filtered off. The product may be purified by means of recrystallization from 65% aqueous ethanol. (M.P. 249–253° C. decomposition). The acid chloride may be prepared from the free acid in benzene as medium, by heating for 2 hours, as described in Example 1.

Example 10

1.47 g. of 6-amino-penicillanic acid and 0.69 g. of triethylamine are dissolved in 17 ml. of anhydrous chloroform, whereupon the solution of 0.77 g. of 1-cyclohexyl-4-methyl-5-pyrazole-carboxylic acid chloride and 14 ml. of anhydrous chloroform is added and the reaction is carried out according to the method set forth in Example 1. Thus 1.01 g. of the potassium salt of 1-cyclohexyl-4-methyl-5-pyrazoly-penicillin obtained in the form of a white powder. The purity of the product was found to be 97% according to iodometric anelysis.

The acid chloride used by acylation (M.P. 64–65° C.) is obtained as follows: 3.76 g. of ethyl-2-oxo-3-ethoxymethylene-butyrate and 3.27 g. of cyclohexyl-hydrazine-hydrochloride are dissolved in 15 ml. of anhydrous ethanol for an hour, whereupon the ethanol is evaporated under reduced pressure. The residue is dissolved in ether, the etherous solution is washed with an aqueous sodium hydrogen carbonate solution and with water until neutral, the solution is then dried and the ether is distilled off. The 1-cyclohexyl-4-methyl-5-carbethoxy-pyrazole is purified by vacuum distillation. B.P. 109–114° C. 0.2 Hg mm. The product is converted into 1-cyclohexyl-4-methyl-5-pyrazolecarboxylic acid with ethanol containing potassium hydroxide according to the method described in Example 3. The free acid may be recrystallized from 40% aqueous ethanol. The acid chloride is prepared from the free acid with thionyl chloride in benzene as medium, as described in Example 1.

Example 11

The following components are compounded and finished in the form of tablets according to usual methods. The composition of a tablet is the following:

| | G. |
|---|---|
| Active ingredient | 0.25 |
| Starch (potato or rice) | 0.024 |
| Talcum | 0.005 |
| Magnesium stearate | 0.001 |
| | 0.280 |

Example 12

The active ingredient is wetted throughly with a solution of ethyl cellulose in ethanol or with the aqueous solution of carboxymethyl-cellulose or an other film-forming agent. The product is granulated by sifting on a No. 24- or 40-mesh screen and dried at a temperature below 30° C. The dry grains are screened on a No. 24 screen and amounts of 0.25–0.50 g. are filled in gelatine capsules.

What we claim is:

1. Compounds of the general formula

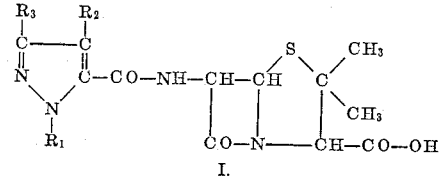

I.

(wherein $R_1$ is a member of the group consisting of phenyl, bromophenyl, chlorophenyl, and cyclohexyl, $R^2$ is a member of the group consisting of halogen and alkyl having 1 to 5 carbon atoms, $R_3$ is a member of the group consisting of hydrogen and alkyl having 1 to 5 carbon atoms) and pharmaceutically acceptable salts thereof.

2. A compound selected from the group consisting of
1-phenyl-3-methyl-4-bromo-5-pyrazolyl-penicillin,
1-(p-bromophenyl)-3-methyl-4-bromo-5-pyrazolyl-penicillin,
1-(p-chlorophenyl)-3-methyl-4-bromo-5-pyrazolyl-penicillin,
1-(p-chlorophenyl)-3-methyl-4-chloro-5-pyrazolyl-penicillin,
1-cyclohexyl-3-methyl-4-chloro-5-pyrazolyl-penicillin,
1-phenyl-4-methyl-5-pyrazolyl-penicillin,
1-(p-chlorophenyl)-4-methyl-5-pyrazolyl-penicillin,
1-(2,6-dichloro-phenyl)-4-methyl-5-pyrazolyl-penicillin,
1-(2,4,6-trichlorophenyl)-4-methyl-5-pyrazolyl-penicillin,
1-cyclohexyl-4-methyl-5-pyrazolyl-penicillin and pharmaceutically acceptable salts of the above compounds.

References Cited

UNITED STATES PATENTS 3,252,971   5/1966   Chow et al. _____ 260—239.1

NICHOLAS S. RIZZO, Primary Examiner.